United States Patent
Kandasamy et al.

(10) Patent No.: US 9,461,914 B2
(45) Date of Patent: Oct. 4, 2016

(54) PATH MAXIMUM TRANSMISSION UNIT HANDLING FOR VIRTUAL PRIVATE NETWORKS

(71) Applicant: Cisco Technology, Inc., San Jose, CA (US)

(72) Inventors: Thamilarasu Kandasamy, Bangalore (IN); Scott Fluhrer, North Attleboro, MA (US); Lewis Chen, Hong Kong (CN); Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 151 days.

(21) Appl. No.: 14/246,351

(22) Filed: Apr. 7, 2014

(65) Prior Publication Data

US 2015/0288603 A1 Oct. 8, 2015

(51) Int. Cl.
*H04L 12/741* (2013.01)
*H04L 12/805* (2013.01)
*H04L 29/06* (2006.01)

(52) U.S. Cl.
CPC .............. *H04L 45/74* (2013.01); *H04L 47/36* (2013.01); *H04L 63/0272* (2013.01)

(58) Field of Classification Search
None
See application file for complete search history.

(56) References Cited

U.S. PATENT DOCUMENTS

| | | | |
|---|---|---|---|
| 7,505,484 B2 | 3/2009 | Pancholi et al. | |
| 7,697,524 B2 | 4/2010 | Subramanian et al. | |
| 2006/0018315 A1* | 1/2006 | Baratakke | H04L 69/16 370/389 |
| 2007/0268918 A1* | 11/2007 | Gopi | H04L 12/4633 370/401 |
| 2008/0159150 A1* | 7/2008 | Ansari | H04L 45/00 370/238 |
| 2009/0003235 A1* | 1/2009 | Jiang | H04L 47/36 370/253 |
| 2009/0310485 A1* | 12/2009 | Averi | H04L 45/00 370/232 |
| 2010/0054251 A1* | 3/2010 | Lee | H04L 12/4641 370/392 |
| 2010/0220649 A1* | 9/2010 | Sakai | H04W 28/065 370/328 |
| 2012/0051236 A1* | 3/2012 | Hegde | H04L 43/10 370/252 |
| 2014/0003424 A1* | 1/2014 | Matsuhira | H04L 47/365 370/389 |
| 2014/0269277 A1* | 9/2014 | DeCusatis | H04L 47/365 370/230 |
| 2015/0146531 A1* | 5/2015 | Welin | H04L 47/36 370/235 |

OTHER PUBLICATIONS

J. Mogul et al., "Path MTU Discovery", Network Working Group, Request for Comments: 1191, Nov. 1990, 14 pages.

(Continued)

*Primary Examiner* — Duc Duong
(74) *Attorney, Agent, or Firm* — Edell, Shapiro & Finnan, LLC (57) ABSTRACT

Techniques are described herein for optimizing communications in a network. At a router in a virtual private network, a packet is received from a device in a subnetwork protected by the router. The router examines the packet to determine a source address that identifies the device and a destination address that identifies a destination network device for the packet. The router also analyzes the packet to determine a size of the packet and determines whether or not the size of the packet is larger than a maximum transmission unit size. If the size of the packet is larger than the maximum transmission unit size, the router encapsulates the packet with a header that includes the destination address and a new source address that identifies the router.

20 Claims, 7 Drawing Sheets

(56) References Cited

OTHER PUBLICATIONS

S. Kent, "IP Encapsulating Security Payload (ESP)", Network Working Group, Request for Comments: 2406, Nov. 1998, 16 pages.
D. Harkins et al., "The Internet Key Exchange (IKE)", Network Working Group, Request for Comments: 2409, Nov. 1998, 29 pages.
S. Kent, "IP Authentication Header", Network Working Group, Request for Comments: 4302, Dec. 2005, 34 pages.
S. Kent, "IP Encapsulating Security Payload (ESP)", Network Working Group, Request for Comments: 4303, Dec. 2005, 31 pages.
B. Weis et al., "Multicast Extensions to the Security Architecture for the Internet Protocol", Network Working Group, Request for Comments: 5374, Nov. 2008, 38 pages.
B. Weis et al., "The Group Domain of Interpretation", Internet Engineering Task Force (IETF), Request for Comments: 6407, Oct. 2011, 64 pages.

\* cited by examiner

*SOURCE IP ADDR IS REPLACED WITH GROUP MEMBER'S IP ADDRESS

PATH MAXIMUM TRANSMISSION UNIT HANDLING FOR VIRTUAL PRIVATE NETWORKS

TECHNICAL FIELD

The present disclosure relates to optimizing communications in networks.

BACKGROUND

Routers are deployed in network environments to manage and route communications between network devices. For example, a network device may send to a router a packet destined for another network device. The router may forward the packet to other routers in the network before the packet is ultimately sent to the destination network device. Network devices may be grouped in subnetworks that, for example, may represent enterprise networks. Network devices in one subnetwork may communicate with network devices in another subnetwork over a public network (e.g., the Internet). However, enterprise networks may require enhanced security for communications between local network devices and network devices in other subnetworks. Thus, the subnetworks communicate by way of a virtual private network (VPN) to enable secure and encrypted messages to be exchanged between network devices in different subnetworks over the Internet.

DESCRIPTION OF EXAMPLE EMBODIMENTS

Overview

Techniques are described herein for optimizing communications in a network. In one embodiment, at a router in a virtual private network, a packet is received from a device in a subnetwork protected by the router. The router examines the packet to determine a source address that identifies the device and a destination address that identifies a destination network device for the packet. The router also analyzes the packet to determine a size of the packet and determines whether or not the size of the packet is larger than a maximum transmission unit size. If the size of the packet is not larger than the maximum transmission unit size, the router encapsulates the packet with a header that includes the destination address and a new source address that identifies the router.

In another embodiment, at a first router in a network, a path maximum transmission unit message is received from a second router in the network. The path maximum transmission unit message comprises maximum transmission unit information describing a maximum acceptable packet size. The first router generates a new path maximum transmission unit message comprising information describing the maximum acceptable packet size. The first router sends the new path maximum transmission unit message to a destination network device in the subnetwork.

Example Embodiments

Figure 1:
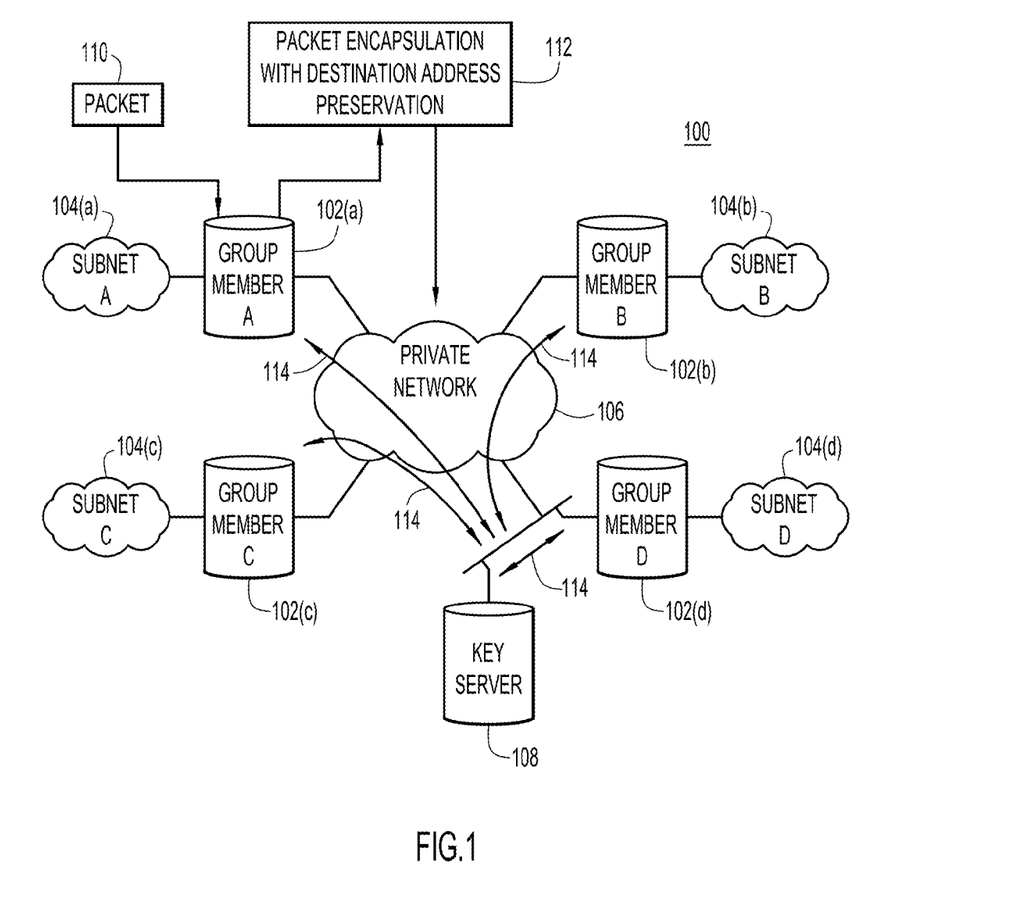
FIG. 1 shows an example network topology depicting a plurality routers arranged in in a private network to enable secure communications between subnetworks, according to an example embodiment.

The techniques presented herein relate to optimizing communications in a network. In particular, these techniques enable efficient communications of conditions along network paths. An example system topology ("system") is shown at reference numeral 100 in FIG. 1. The system 100 comprises a plurality of router devices ("routers") shown at reference numerals 102(a)-102(d), a plurality of subnetworks (subnets) 104(a)-104(d), a private network 106 and a key server 108. The routers 102(a)-102(d) are devices that are configured to manage and route communications between network devices in the system 100. In particular, each of the routers 102(a)-102(d) is configured to route communications to and from network devices in corresponding subnetworks 104(a)-104(d). In FIG. 1, subnetwork 104(a) is also referred to as "subnetwork A" or "subnet A," subnetwork 104(b) is also referred to as "subnetwork B" or "subnet B," and so on. In an example, router 102(a) is configured to route communications to and from network devices in subnet A, router 102(b) is configured to route communications to and from network devices subnet B, router 102(c) is configured to route communications to and from network devices subnet C, and router 102(d) is configured to route communications to and from network devices subnet D. It should be appreciated that the network devices in the subnetworks 104(a)-104(d) are not shown in FIG. 1. It should be further appreciated that FIG. 1 may comprise any number of routers and subnetworks. The topology of system 100 in FIG. 1 is merely an example.

In addition to routing communications to and from corresponding subnetworks, the routers 102(a)-102(d) are configured to communicate with each other by way of the private network 106. The private network 106 enables network devices in one subnetwork to exchange secure and encrypted communications (e.g., packets) with network devices in other subnetworks via one or more of the routers 102(a)-102(d). For example, subnet A may represent a branch office of an enterprise network of a financial institution, and subnet B may represent a data center of the same financial institution. Administrators of subnet A and subnet B may require that network devices in subnet A exchange only secure and encrypted communications with network devices in subnet B, and vice versa. Thus, a client device in subnet A may send a packet 110 to router 102(a), and the router 102(a) may encapsulate the packet to ensure that the packet is encrypted and secure, as shown at reference numeral 112. The router 102(a) may then send the packet to router 102(b) across the private network 106. The router 102(*b*), upon receiving the encrypted packet, may decapsulate the packet and send it to the appropriate destination network device in subnet B. It should be appreciated that the terms "encrypted" and "encapsulated" are used interchangeably herein. In one example, packet encapsulation is a technique used when encrypting a packet for secure transmission across a private network, and packet decapsulation is a technique used when decrypting an encrypted packet in order to obtain the original packet.

Secure and encrypted communications between subnet A and subnet B may be exchanged over a public network (e.g., the Internet) using encapsulation for public network communication protocols (e.g., encapsulated Internet Protocol (IP) communications or IP Security (IPSec) communications). Thus, the private network 106 may represent a secure private network within the public network for the routers 102(*a*)-102(*d*) to exchange communications with each other. As such, the private network 106 may also be referred to as a virtual private network (VPN). Further details about the private network 106 are described herein.

The routers 102(*a*)-102(*d*) are also configured to exchange communications with the key server 108 across the private network 106. These communications are shown at reference numeral 114 in FIG. 1. The key server 108 is a device (or process) that periodically generates and distributes cryptographic keys to the routers 102(*a*)-102(*d*). For example, the key server 108 is configured to obtain security policy information that describes which routers in the system 100 are to become members of the same VPN. The key server 108 is able to define the router devices to be members of a VPN by sending the same cryptographic keys to the routers that are part of the same VPN. For example, the key server 108 will periodically distribute a group key to all of the routers that are determined to become members of a same VPN. In FIG. 1, the routers 102(*a*)-102(*d*) are part of the same VPN, and thus, the routers 102(*a*)-102(*d*) receive the same group key from the key server 108. Upon successfully receiving the group key and authenticating with the key server 108, the routers 102(*a*)-102(*d*) can exchange secure and encrypted communications with each other. Additionally, as stated above, the key server 108 may periodically distribute group keys to the routers 102(*a*)-102(*d*) to ensure their membership to the VPN. The key server 108 may distribute a different group key to other routers (not shown) in the system 100 to create another VPN group. Likewise, the key server 108 may distribute a different group key to some but not all of the routers 102(*a*)-102(*d*), such that these routers may be members of both the private network 106 shown in FIG. 1 and another VPN.

Routers that are part of the same VPN are referred to as "group members" of the VPN. As stated above, in FIG. 1, routers 102(*a*)-102(*d*) are group members of the same VPN (i.e., private network 106). Router 102(*a*) may be referred to as "group member A" or "GM A," router 102(*b*) may be referred to as "group member B" or "GM B," and so on. Group members are also referred to as peer routers, and for example, GM A, GM B, GM C and GM D are all group peer routers. For example, GM A receives a packet from a network device in subnet A and encrypts the packet by encapsulating it in a format that is capable of being decapsulated by other group members (e.g., GM B, GM C and GM D). GM A then sends the encapsulated packet to the appropriate router in the VPN (private network 106) to be decapsulated and sent to the destination network device in another subnetwork. Likewise, upon receiving an encapsulated packet from another group member in the VPN, GM A can decapsulate the packet and send the decapsulated packet to the appropriate destination network device in subnet A. Thus, the GM A is said to "protect" network devices in subnet A, since GM A ensures that packets sent by the network devices in subnet A are securely transmitted to other group members in the VPN. Similarly, GM B protects network devices in subnet B, GM C protects network devices in subnet C, and GM D protects network devices in subnet D.

The key server 108 may distribute the keys to the group members using, e.g., key exchanges described by the Internet Key Exchange (IKE) and/or IKE version 2 (IKEv2) protocol. In one example, the IKE protocol is described in the Request for Comments (RFC) 2409 by the Internet Engineering Task Force (IETF). Furthermore, IETF RFC 6407 describes a Group Domain of Interpretation (GDOI) protocol for techniques of a key server distributing a group key to group members. These protocols are merely examples, and other group key distribution protocols known or contemplated may be used to enable the key server 108 to distribute group keys to group members of a VPN.

Once the routers 102(*a*)-102(*d*) have received the group key from the key server 108, and upon the key server 108 authenticating each router, the routers 102(*a*)-102(*d*) are admitted as group members to the VPN. The group members are configured to exchange encrypted traffic with each other using the group key received from the key server 108. The key server 108 may send new group keys periodically to the group members (e.g., "rekeys"), and group members that receive the rekey remain as members of the VPN. The key server 108 can add other routers to the VPN by sending the rekey to the other routers, and likewise, the key server 108 may drop routers from the VPN by not sending the rekey. Thus, by sending the group key to the routers 102(*a*)-102(*d*), the key server 108 defines a group VPN, in which the routers 102(*a*)-102(*d*) are group members of a fully-meshed VPN with any-to-any connectivity between the routers.

As stated above, the VPN may be a private network within a public network such as the Internet, and thus, after joining as group members to the VPN, the routers 104(*a*)-104(*d*) may exchange encrypted communications in accordance with public exchange protocols. In other words, the routers 104(*a*)-104(*d*) may exchange communications with each other by encapsulating packets of public exchange protocols. For example, a network device in subnet A may send to GM A an IP packet (e.g., packet 110 in FIG. 1) destined for a network device in subnet B. It should be appreciated that the techniques described herein are applicable to any public exchange protocol, and IP exchanges is used as an example. GM A, upon receiving the packet, encapsulates the IP packet with an outer header and encryption information in accordance with the parameters set by the key server 108 during the latest key exchange with GM A. The packet encapsulation example is generally shown at 112 in FIG. 1. In one example, GM A may encapsulate the IP packet such that the IP packet is now delivered to GM B in the VPN as a secure and encrypted Internet Protocol Security (IPSec) packet. GM B receives the encapsulated IPSec packet, and since GM B is part of the same VPN group and is provisioned with the same key information as GM A, GM B is able to decapsulate the packet and deliver the underlying IP packet to the network device in subnet B. Since the IP packet is encapsulated by GM A, if an intermediate router in the network path between GM A and GM B receives the packet, the intermediate router in the network path would not be able to decapsulate the encapsulated IP packet, because the intermediate router is not part of the same VPN group as GM A and GM B. Thus, the network path between GM A and GM B may utilize public routers to forward the encapsulated IP packet, but only specific group member routers are able to decapsulate the encapsulated IP packet.

In existing group VPN implementations, as group members perform packet encapsulation, the group members encapsulate a packet with a security payload and with an outer header that maintains address information included within the original packet. For example, according to existing techniques, when a group member encapsulates an IP packet received from a network device in a corresponding subnetwork protected by the group member, the group member adds (e.g., prepends) an outer IP header to the IP packet. The outer IP header of the packet typically includes the original source IP address, identifying the network device that sent the packet to the group member, and the original destination IP address, identifying the network device for which the packet is destined. Thus, the group member is said to perform address preservation on the encapsulated packet by including in the outer IP header the original source IP address and destination IP address included in the underlying IP packet. Since the IP address parameters are maintained in the outer IP header, many network features that rely on IP address information (operations such as routing, firewall operations, Quality of Service, traffic management, etc.) are still operable on the encapsulated packet.

Additionally, in existing group VPN implementations, different paths between group members of a VPN may have different load capabilities. For example, Path Maximum Transmission Unit (PMTU) values of a path between a first group member and a second group member may be different from a PMTU value of a path between the first group member and a third group member. PMTU discovery techniques, for example, are described in IETF RFC 1191. In general, PMTU techniques describe a Maximum Transmission Unit (MTU) value for a given network path before packet disruption (e.g., IP fragmentation) occurs. When the PMTU value is exceeded by a packet, one or more network devices along the network path may send to the originator of the packet an Internet Control Message Protocol (ICMP) message. For example, if a source network device sends to a group member an IP packet that is too large to traverse a network path between the group member and the destination network device, the group member may send an ICMP message back to the source network device. This ICMP message is also referred to as an "ICMP PAK TOO BIG" message. The "ICMP PAK TOO BIG" indicates to the source network device that the packet it sent was too large to traverse the network path.

As stated above, group members are configured to perform address preservation techniques. However, the address preservation techniques used in existing group VPN implementations may present drawbacks, particularly in the context of handling PMTU messages. For example, referring to FIG. 1, a source network device in subnet A sends to GM A an IP packet that is destined for a destination network device in subnet C. The path between the source network device and the destination network device may include multiple group members (and other non-group member routers), and the IP packet may be too large to traverse the path. However, in existing group VPN implementations, when the source network device sends the packet to GM A, GM A will encapsulate the IP packet using the address preservation techniques described above. In other words, GM A will encapsulate the IP packet with an outer IP header including the original source IP address identifying the source network device in the IP packet and the original destination IP address identifying the destination network device in the IP packet. However, another router in the path will determine that the IP packet is too large to traverse the path. For example, a router that is not a group member ("non-group member router") may determine that the IP packet is too large. In response to determining that the packet is too large, the non-group member router will send a PMTU message (e.g., an "ICMP PAK TOO BIG" message) to the source address that is present in the outer IP header of the encapsulated IP packet, i.e., the IP address of the source network device. The source network device will receive the PMTU message via GM A, and when the source network device receives the PMTU message, the source network device reduces the size of the IP packet in response to the information contained in the PMTU message. However, the reduced-size IP packet will still be encapsulated by GM A upon being sent by the source network device, and thus, even though the source network device may reduce the size of the IP packet, the packet encapsulation techniques performed by GM A may still cause the IP packet to be over the allowable size for a particular network path (e.g., as specified in the PMTU message).

Thus, existing techniques for address preservation may cause problems for effective transmission of PMTU messages to network devices. One possible solution may involve a group member intercepting all PMTU messages and processing the messages corresponding to the encapsulated packets that it transmitted. However, this approach would result in additional processing overhead for the group member. Another solution may involve a group member learning a PMTU value and associating the PMTU value with a shared security association (SA) or group key for the group VPN. This solution, however, may not be desirable, as network paths between group members would be reduced to the lowest PMTU value, and lower PMTU values shared with group members may adversely impact traffic for different paths between group members in the group VPN. The techniques described herein address these concerns by, e.g., optimizing address preservation operations.

Figure 2A:
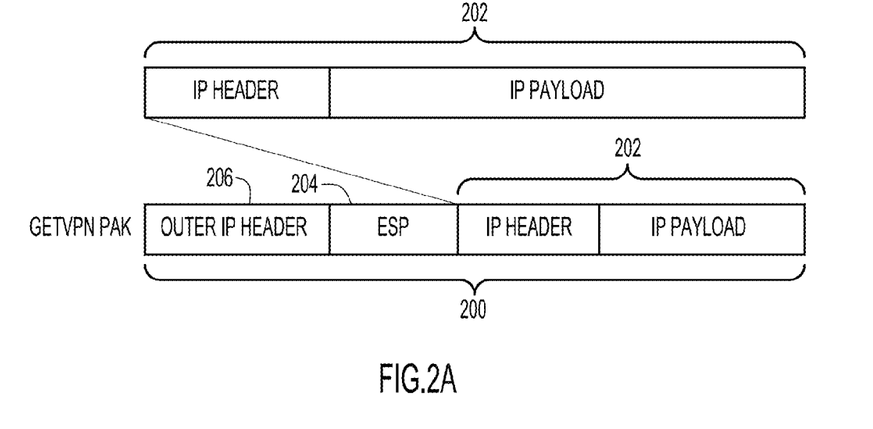
FIGS. 2A and 2B show an example of an encapsulated packet with an outer header to be sent in the private network, according to an example embodiment.
Figure 2B:
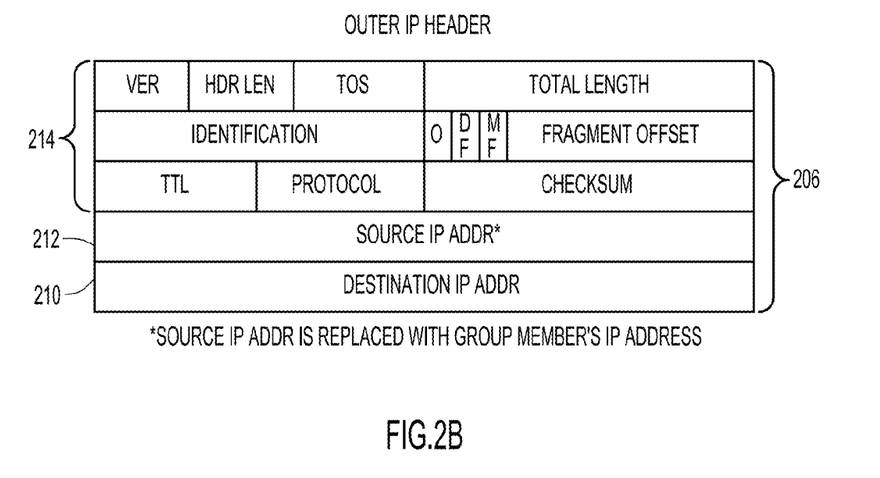

Reference is now made to FIGS. 2A and 2B, which show an example of an encapsulated packet to be sent in the private network 106. Referring first to FIG. 2A, a group VPN packet is shown at reference numeral 200. As stated above a group member may receive an IP packet from a network device in a corresponding subnet. For example, a source network device in subnet A sends an IP packet to GM A. This IP packet is also referred to herein as the "original IP packet." The original IP packet is shown at reference numeral 202. Upon receiving the original IP packet 202, GM A encapsulates the original IP packet 202 by adding an Encapsulating Security Payload (ESP) header 204 to the original IP packet. The ESP header 204 is a standard ESP header as described in, e.g., IETF RFC 2406 and IETF RFC 4303. The ESP header may also be an Authentication Header (AH), described in, e.g., IETF RFC 4302. For example, the ESP header 204, in general, is used to provide confidentiality, data origin authentication, connectionless integrity, etc. for the original IP packet 202. In one example, the information contained in the ESP header 204 is related to the group key information obtained by GM A from the key server 108 such that other group members that also received the same group key information from the key server 108 can decapsulate the ESP header 204 to obtain the contents of the original IP packet 202.

In addition to adding the ESP header 204 to the original IP packet 202, GM A also adds an outer IP header, shown at reference numeral 206, to the ESP header 204. In existing group VPN techniques, the outer IP header 206 includes the source IP address (identifying the source network device) and the destination IP address (identifying the destination network device) included in the original IP packet 202. However, according to the techniques herein and as shown in FIG. 2B, the outer IP header 206 is generated to include the destination IP address of the original IP packet 202. The destination IP address of the original packet is shown at reference numeral 210 in FIG. 2B in the outer IP header 206. In the techniques described herein, the outer IP header 206, however, does not include the source IP address of the original IP packet 202. Instead, the outer IP header 206 includes the source IP address of GM A (or whichever group member is performing the packet encapsulation). The source address of GM A is shown at reference numeral 212. The outer IP header also comprises other packet information shown at 214, which is derived from or is a copy of the original IP packet 202. For example, the outer IP header may include information about the original IP packet version ("ver"), e.g., IPv4 or IPv6, the header length ("hdr len") of the original IP packet, type of service or "ToS" information, the total length of the original IP packet, an identification field of the original IP packet, packet fragment offset information, time-to-live ("TTL") information of the original IP packet, protocol information associated with the original IP packet and checksum values. Thus, the group VPN packet 200, according to the techniques described herein, includes the original IP packet 202 sent by the source network device, an ESP header 204 that contains encryption information, and a modified outer IP header 206 including the destination IP address from the original IP packet 202 and a new source IP address (e.g., an address different form the source IP address of the original IP packet 202) that identifies the group member performing the packet encapsulation. The resulting group VPN packet 200 is, e.g., an IPSec packet that is able to carry the original IP packet 202 securely and in an encrypted manner across the VPN to other group members. The other group members can decapsulate the packet and send the original IP packet 202 to the destination network device.

As stated above, a group member performs address preservation on an encapsulated packet by including address information in the outer IP header. According to the techniques described herein, a group member performs modified address preservation by including only the destination IP address of the original IP packet in the outer IP header and not including the source IP address of the original IP packet in the outer IP header. This modified address preservation is also referred to as "destination address only preservation." Additionally, as stated above, the outer IP header, according to the present techniques, comprises the source IP address of the group member together with the destination IP address of the original IP packet. When the encapsulated packet is sent in the VPN, and if the IP packet is too large, a non-group member router along a network path between the source network device and the destination network will send a PMTU message to the source address that is present in the outer IP header of the encapsulated packet. Thus, according to the techniques herein, the PMTU message will be sent to the group member that encapsulated the original IP packet and not to the network device that was the source of the IP packet. In other words, since the outer IP header includes the source IP address of the group member that performs the encapsulation of the original IP packet instead of the source IP address identifying the source network device, PMTU messages (e.g., "ICMP PAK TOO BIG" messages) are sent to the group member performing the encapsulation and not to the source network device. The group member performing the encapsulation will then send a new PMTU message to the source network device instructing the source network device that the PMTU is even smaller than is indicated in the original PMTU message received by the group member. The new PMTU message enables the source network device to reduce the IP packet size sufficiently such that any encapsulation performed on the IP packet is still lower than the PMTU value specified in the original PMTU message received by the group member. For example, when the group member sends the new PMTU message to the source network device, the group member may lower the PMTU value contained in the new PMTU by at least a number of bytes necessary for the group member to perform the encapsulation techniques (e.g., IP encapsulation).

In addition to modifying the outer IP header of the encapsulated packet, a group member is also configured to maintain a database or table of PMTU values. This table is referred to generally as an MTU cache table, since it may store PMTU values or may also store MTU values. An example of the MTU cache table is shown below as Table 1.

TABLE 1

MTU cache table

| Network Device Address | PMTU Value (bytes) | Age (seconds) |
| --- | --- | --- |
| 10.10.10.10 | 1200 | 240 |
| 20.20.20.20 | 1000 | 360 |

As stated above, with destination address only preservation, PMTU messages are destined for group members instead of source network devices. Thus, a group member (e.g., GM A) that receives a PMTU message processes the PMTU message as the destination network device for the PMTU message. For example, GM A, upon receiving a PMTU message will evaluate the PMTU message to determine the PMTU value contained therein. GM A will then generate a new PMTU message with a reduced PMTU value, and will send the new PMTU message to the source network device. In other words, the source network device in subnet A sent the original packet that resulted in the PMTU message. This PMTU message ("original PMTU message") is received by GM A (due to destination address only preservation). The original PMTU message is sent by the non-group member that detects that the original packet size is too large. GM A inspects the original PMTU message and determines a PMTU value. GM A then generates a new PMTU message with new PMTU value information that is reduced (e.g., by the at least the number of bits required to encapsulate a packet from the source network device). GM A sends the new PMTU message with the new PMTU value information. The source network device inspects the new PMTU message and obtains the new PMTU value. Accordingly, the source network device reduces the packet size in accordance with the new PMTU value. Thus, the packet size is sufficiently reduced such that upon encapsulation by GM A, the packet will still be sufficiently small to satisfy PMTU limits of a network path.

GM A maintains the addresses of the network devices for which new PMTU messages are to be sent. For example, in Table 1, network device address "10.10.10.10" refers to a first network device in subnet A, and network device address "20.20.20.20" refers to a second network device in subnet A. As stated above, GM A generates a new PMTU message with a new PMTU value, and GM A sends the new PMTU message to the appropriate network device in subnet A. GM A also stores the new PMTU value associated with each device. Thus, in Table 1, the first network device in subnet A has a new PMTU value of 1200 bytes and the second network device in subnet A has a new PMTU value of 1000 bytes. These new PMTU values, in general, specify the maximum size of packets capable of being sent by the corresponding network device in the private network 106 before GM A performs any packet encapsulation. It should be appreciated that GM A may also maintain PMTU values associated with the original PMTU messages. The PMTU values associated with the original PMTU messages specify the largest acceptable packet size of a packet after GM A performs packet encapsulation.

If the source network device sends to GM A a packet larger than the new PMTU value, GM A will return another PMTU message to the source network device. This PMTU message may contain maximum packet size information that describes a maximum packet size limit for the packet from the source network device before the packet is to be encapsulated. Additionally, the PMTU message may indicate to the source network device that the packet size is too large. Likewise, after encapsulation, if the packets are larger than the maximum sizes (described by the PMTU values in the original PMTU messages), non-group member routers in the network path will return to GM A PMTU messages indicating that the packets are too large to be sent in the network path. Table 1 also lists the age for the new PMTU values associated with the network device in subnet A. The age indicates the freshness of the new PMTU values for the network devices. For example, in Table 1, the age of the new PMTU value for the first network device in subnet A is 240 seconds, and the age of the new PMTU value for the second network device in subnet A is 360 seconds. Thus, according to Table 1, GM A last generated a new PMTU message for the first network device 240 seconds ago, while GM A generated a PMTU message for the second network device 360 seconds ago. It should be appreciated that the age of the new PMTU values corresponds to the age of the PMTU values in the original PMTU messages received by GM A. As described herein, the age metric in Table 1 helps GM A determine whether or not to generate another new PMTU message intended for a network device in subnet A upon receiving a PMTU message from a non-group member router.

Figure 3:
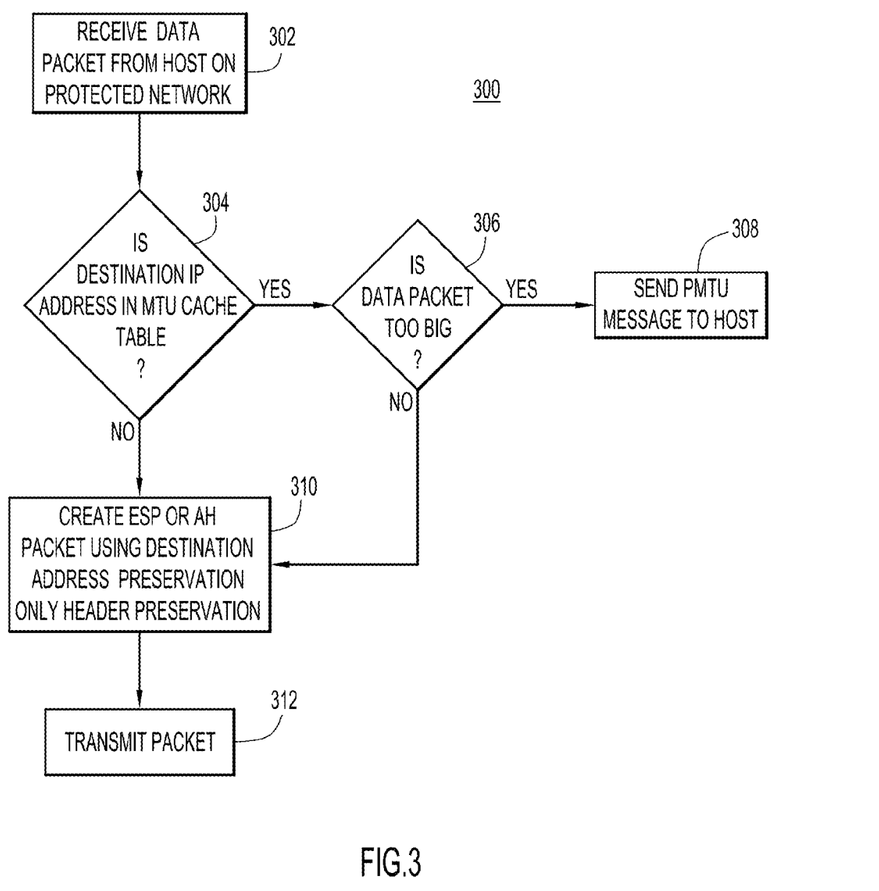
FIG. 3 shows an example flow chart depicting operations of a router receiving a message from a network device in a subnetwork protected by the router, according to an example embodiment.

Reference is now made to FIG. 3, which shows an example flow chart 300 depicting operations of a group member receiving a message from a network device in a subnetwork protected by the group member. For simplicity, the operations in FIG. 3 are described with GM A as the group member, though these operations may be applicable to any group members of a VPN. Reference is also made to FIG. 1 for purposes of the description of FIG. 3. At 302, GM A receives a data packet from a device ("host") in subnet A (i.e., the protected network for GM A). The data packet may be an IP packet, as describe above. At 304, GM A determines whether or not the destination IP address of the packet is stored in its MTU cache table. If so, at operation 306, GM A determines whether or not the size of the IP packet is larger than the PMTU value stored in the MTU cache table. If the packet is too large, then at 308, GM A sends a PMTU message to the source network device in subnet A. For example, GM A may send an "ICMP PAK TOO BIG" message to the source network device. If the destination IP address of the packet is not stored in the MTU cache table or if the size of the IP packet is not larger than the PMTU value (e.g., if the answer to operations 304 or 306 is "no"), at 310, GM A encapsulates the IP packet by creating an ESP header or an AH header using destination address preservation only techniques. At 312, GM A then transmits the encapsulated packet in the private network 106.

Figure 4:
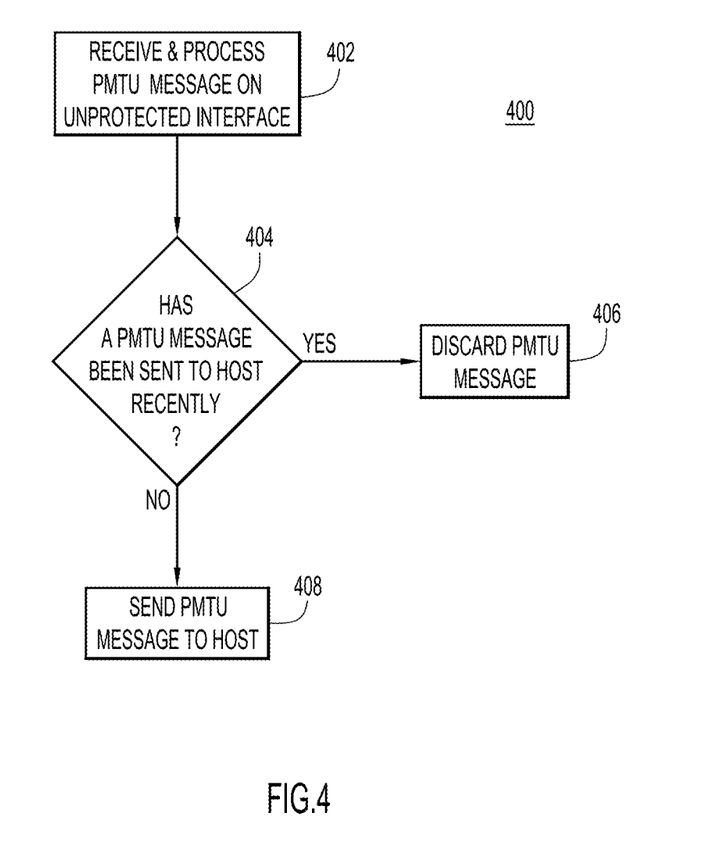
FIG. 4 shows an example flow chart depicting operations of the router receiving a message in the private network, according to an example embodiment.

Reference is now made to FIG. 4, which shows an example flowchart 400 depicting operations of a group member receiving an encapsulated message in the private network 106. In FIG. 4, GM A is referenced as an example group member to describe the operations. At 402, GM A receives a PMTU message from an "unprotected interface" (e.g., from a network device that is not in the subnetwork that GM A protects (i.e., subnet A)). At operation 404, GM A determines whether or not a PMTU message has recently been sent to the source network device in subnet A (e.g., whether or not a new PMTU message generated by GM A has been sent to the source network device in subnet A within a predetermined period of time). For example, GM A might determine this by evaluating the age value in an MTU cache table. GM A may send new PMTU messages to the source network device frequently. If the PMTU message has been sent to the source network device recently (e.g., if the age value is less than a predetermined threshold), at 406, GM A discards the PMTU message and does not send a new PMTU message to the source network device in subnet A. If, however, the PMTU message has not been sent to the host recently (i.e., if the answer to the determination 404 is "no"), GM A, at 408, sends a new PMTU message to the source network device in subnet A. It should be appreciated that GM A may source may send the new PMTU message after receiving another packet that matches the entry in the MTU cache table.

Figure 5:
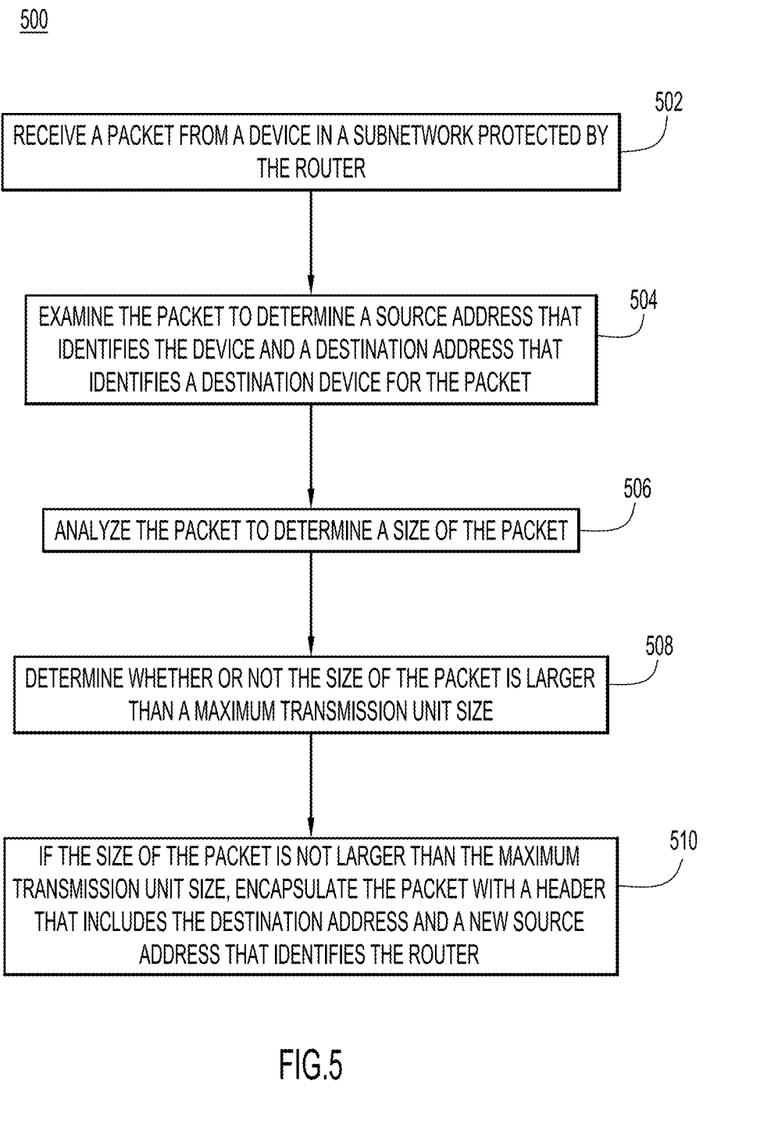
FIG. 5 shows an example flow chart depicting operations performed by the router to modify the outer header of the encapsulated packet, according to an example embodiment.

Reference is now made to FIG. 5. FIG. 5 shows a flow chart 500 depicting destination address only preservation operations performed by a router. At 502, a router (e.g., group member) receives a packet from a device in a subnetwork protected by the router. At 504, the router examines the packet to determine a source address that identifies the device and a destination address that identifies a destination network device for the packet. The router, at 506, analyzes the packet to determine a size of the packet. At 508, the router determines whether or not the size of the packet is larger than a maximum transmission unit size, and at 510, if the size of the packet is not larger than the maximum transmission unit size, the router encapsulates the packet with a header that includes the destination address and a new source address that identifies the router.

Figure 6:
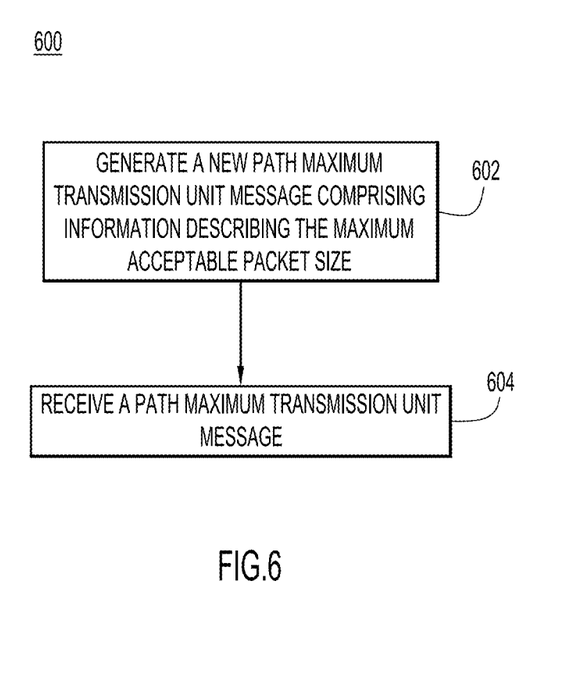
FIG. 6 shows an example flow chart depicting operations performed by the router to generate a path maximum transmission unit message, according to an example embodiment.

Reference is now made to FIG. 6. FIG. 6 shows an example block diagram 600 depicting operations of a router device generating a path maximum transmission unit message. It should be appreciated that the operations in FIG. 6 may be performed by any group member of a virtual private network. At 602, a first router in a network receives from a second router in the network a path maximum transmission unit message. The path maximum transmission unit message comprises maximum transmission unit information describing a maximum acceptable packet size. At 604, a new path maximum transmission unit message is generated comprising information describing the maximum acceptable packet size. At 606, the new path maximum transmission unit message is sent to a destination network device in a subnetwork.

Figure 7:
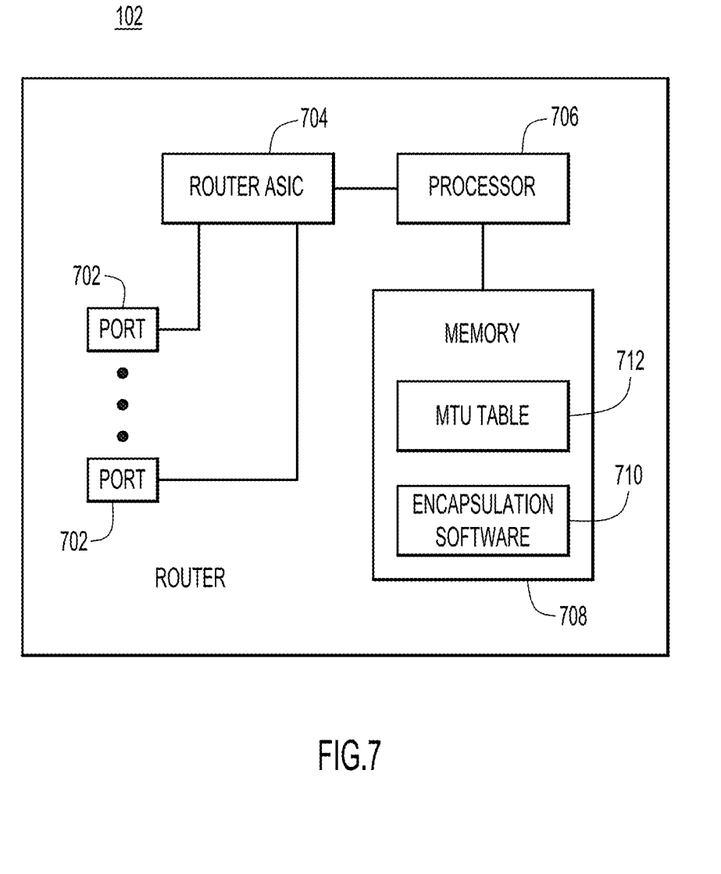
FIG. 7 shows an example block diagram of the router configured to encapsulate a packet received from the network device in the subnetwork protected by the router, according to an example embodiment.

Reference is now made to FIG. 7. FIG. 7 shows an example block diagram of a router 102 configured to encapsulate a packet received from a network device in a subnetwork protected by the router and to modify the outer header of the encapsulated packet. It should be appreciated that the router 102 in FIG. 7 may be any of the group member routers 102(*a*)-102(*d*). For simplicity, the router in FIG. 7 is referred to generally as router 102. The router device 102 comprises, among other components, a plurality of port units 702, a router application specific integrated circuit (ASIC) 704, a processor 706 and a memory 708. The ports 702 receive communications (e.g., packets) from network devices and are configured to send communications to network devices. The ports 702 are coupled to the router ASIC 704. The router ASIC 704 receives instructions from the processor 706 and forwards packets to appropriate port units 702 for transmission to a destination network device. The router ASIC 704 is coupled to the processor 706. The processor 706 is, for example, a microprocessor or microcontroller that is configured to execute program logic instructions (i.e., software) for carrying out various operations and tasks of the router 102, as described above. For example, the processor 706 is configured to execute encapsulation software 710 according to the techniques described above. The encapsulation software 710 also instructs the processor to maintain and update an MTU table 712 as described herein. The functions of the processor 706 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 708 may comprise read only memory (ROM), random access memory (RAM), magnetic disk storage media devices, optical storage media devices, flash memory devices, electrical, optical, or other physical/tangible (non-transitory) memory storage devices. The memory 708 stores software instructions for the encapsulation software 710. The memory 708 also stores the MTU table 712. Thus, in general, the memory 708 may comprise one or more computer readable storage media (e.g., a memory storage device) encoded with software comprising computer executable instructions and when the software is executed (e.g., by the processor 706) it is operable to perform the operations described for the encapsulation software 710.

The encapsulation software 710 may take any of a variety of forms, so as to be encoded in one or more tangible computer readable memory media or storage device for execution, such as fixed logic or programmable logic (e.g., software/computer instructions executed by a processor), and the processor 606 may be an ASIC that comprises fixed digital logic, or a combination thereof.

For example, the processor 706 may be embodied by digital logic gates in a fixed or programmable digital logic integrated circuit, which digital logic gates are configured to perform the encapsulation software 710. In general, the encapsulation software 710 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the routers and network devices may be performed by one or more computer or machine readable storage media (non-transitory) or device executed by a processor and comprising software, hardware or a combination of software and hardware to perform the techniques described herein.

In summary, a method is provided comprising: at a router in a virtual private network, receiving a packet from a device in a subnetwork protected by the router; examining the packet to determine a source address that identifies the device and a destination address that identifies a destination network device for the packet; analyzing the packet to determine a size of the packet; determining whether or not the size of the packet is larger than a maximum transmission unit size; and if the size of the packet is not larger than the maximum transmission unit size, encapsulating the packet with a header that includes the destination address and a new source address that identifies the router.

Additionally, a method is provided comprising: at a first router in a network, receiving from a second router in the network a path maximum transmission unit message that comprises maximum transmission unit information describing a maximum acceptable packet size; generating a new path maximum transmission unit message comprising information describing the maximum acceptable packet size; and sending the new path maximum transmission unit message to a destination network device in a subnetwork.

In addition, a computer-readable storage media is provided that is encoded with software comprising computer executable instructions and when the software is executed operable to: examine a packet received from a device in a subnetwork protected by a router in a virtual private network to determine a source address that identifies the device and a destination address that identifies a destination network device for the packet; analyze the packet to determine a size of the packet; determine whether or not the size of the packet is larger than a maximum transmission unit size; and if the size of the packet is not larger than the maximum transmission unit size, encapsulate the packet with a header that includes the destination address and a new source address that identifies the router.

Furthermore, an apparatus is provided comprising: a plurality of ports configured to receive and send messages in a network; and a processor coupled to the ports, and configured to: examine a packet received from a device in a subnetwork protected by the apparatus in a virtual private network to determine a source address that identifies the device and a destination network device that identifies a destination network device for the packet; analyze the packet to determine a size of the packet; determine whether or not the size of the packet is larger than a maximum transmission unit size; and if the size of the packet is not larger than the maximum transmission unit size, encapsulate the packet with a header that includes the destination address and a new source address that identifies the apparatus.

The above description is intended by way of example only. Various modifications and structural changes may be made therein without departing from the scope of the concepts described herein and within the scope and range of equivalents of the claims.

What is claimed is:
1. A method comprising:
   at a router in a virtual private network, receiving a packet from a device in a subnetwork protected by the router;
   examining the packet to determine a source address that identifies the device and a destination address that identifies a destination network device for the packet;
   analyzing the packet to determine a size of the packet;
   determining whether or not the size of the packet is larger than a maximum transmission unit size; and
   if the size of the packet is not larger than the maximum transmission unit size, encapsulating the packet with a header that includes the destination address and a new source address that identifies the router.

2. The method of claim 1, further comprising generating a path maximum transmission unit message to be sent to the device if the size of the packet is larger than the maximum transmission unit size.

3. The method of claim 2, further comprising sending to the device the path maximum transmission unit message indicating that the packet size is too large.

4. The method of claim 1, wherein the path maximum transmission unit message contains maximum packet size information that describes a maximum packet size limit for the packet from the device before the packet is encapsulated.

5. The method of claim 1, wherein encapsulating comprises encapsulating the packet with the header such that the header does not include the source address that identifies the device.

6. The method of claim 5, wherein encapsulating comprises encapsulating the packet as an Internet Protocol Security packet such that the Internet Protocol Security packet has a header that includes the destination address and the new source address.

7. The method of claim 1, further comprising forwarding the encapsulated packet in the virtual private network with the header comprising the destination address and the new source address.

8. A method comprising:
at a first router in a network, receiving a packet sent from a source network device in a subnetwork protected by the first router to a destination network device;
encapsulating the packet with a header that includes a new source address that identifies the first router;
receiving from a second router in the network a path maximum transmission unit message that comprises maximum transmission unit information describing a first maximum acceptable packet size for packets sent to the destination network device;
generating a new path maximum transmission unit message comprising new maximum transmission unit information describing a new maximum acceptable packet size before packet encapsulation, wherein the new maximum acceptable packet size is smaller than the first maximum acceptable packet size; and
sending the new path maximum transmission unit message to the source network device in the subnetwork.

9. The method of claim 8, wherein sending comprises sending the new path maximum transmission unit message to the source network device in the subnetwork after receiving the path maximum transmission unit message from the second router.

10. The method of claim 8, further comprising storing the maximum transmission unit information describing the maximum acceptable packet size in a table together with an address of the source network device and a time duration value indicating a time duration after which the new path maximum transmission unit message was generated by the first router.

11. The method of claim 8, further comprising:
determining whether or not a previous path maximum transmission unit message has been sent to the source network device; and
if a previous path maximum transmission unit message has been sent to the source network device, sending the new path maximum transmission unit message to the source network device when the previous path maximum transmission unit message has not been sent within a predetermined period of time.

12. The method of claim 8, wherein sending comprises sending to the source network device in the subnetwork an Internet Control Message Protocol message.

13. A non-transitory computer-readable storage media encoded with software comprising computer executable instructions and when the software is executed operable to:
examine a packet received from a device in a subnetwork protected by a router in a virtual private network to determine a source address that identifies the device and a destination address that identifies a destination network device for the packet;
analyze the packet to determine a size of the packet;
determine whether or not the size of the packet is larger than a maximum transmission unit size; and
if the size of the packet is not larger than the maximum transmission unit size, encapsulate the packet with a header that includes the destination address and a new source address that identifies the router.

14. The non-transitory computer-readable storage media of claim 13, further comprising instructions operable to generate a path maximum transmission unit message to be sent to the device if the size of the packet is larger than the maximum transmission unit size.

15. The non-transitory computer-readable storage media of claim 14, further comprising instructions operable to send to the device the path maximum transmission unit message indicating that the packet size is too large.

16. The non-transitory computer-readable storage media of claim 13, wherein the instructions operable to encapsulate comprise instructions operable to encapsulate the packet with the header such that the header does not include the source address that identifies the device.

17. An apparatus comprising:
a plurality of ports configured to receive and send messages in a network; and
a processor coupled to the ports, and configured to:
examine a packet received from a device in a subnetwork protected by the apparatus in a virtual private network to determine a source address that identifies the device and a destination network device that identifies a destination network device for the packet;
analyze the packet to determine a size of the packet;
determine whether or not the size of the packet is larger than a maximum transmission unit size; and
if the size of the packet is not larger than the maximum transmission unit size, encapsulate the packet with a header that includes the destination address and a new source address that identifies the apparatus.

18. The apparatus of claim 17, wherein the processor is further configured to generate a path maximum transmission unit message to be sent to the device if the size of the packet is larger than the maximum transmission unit size.

19. The apparatus of claim 18, wherein the processor is further configured to send to the device the path maximum transmission unit message indicating that the packet size is too large.

20. The apparatus of claim 17, wherein the processor is further configured to encapsulate the packet with the header such that the header does not include the source address that identifies the device.

* * * * *